United States Patent [19]

Finlay

[11] 3,727,141

[45] Apr. 10, 1973

[54] TRIGGER CIRCUIT FOR A BISTABLE MULTIVIBRATOR

[75] Inventor: Joseph C. Finlay, Glascow, Scotland

[73] Assignee: Burroughs Corporation, Detroit, Mich.

[22] Filed: Nov. 10, 1971

[21] Appl. No.: 197,388

[30] Foreign Application Priority Data

Apr. 3, 1971 Great Britain........................8,632/71

[52] U.S. Cl...................328/60, 307/247 A, 307/291, 328/196, 328/206

[51] Int. Cl..................................................H03k 5/00

[58] Field of Search..............307/246, 247 A, 247 R, 307/266, 291, 260; 328/58, 195, 196, 206, 60

[56] References Cited

UNITED STATES PATENTS

| | | | |
|---|---|---|---|
| 3,264,496 | 8/1966 | Scholl | 307/291 X |
| 2,909,675 | 10/1959 | Edson | 307/247 R |
| 3,105,939 | 10/1963 | Onno et al. | 328/58 X |

*Primary Examiner*—John Zazworsky
*Attorney*—Paul W. Fish et al.

[57] ABSTRACT

A set-reset trigger circuit for a bistable multivibrator is provided in which a pair of electrical charging circuits are manually coupleable across a source of electric power in a mutually reverse order with respect to their individual elements to immediately thereby produce a set pulse at an output of one of the charging circuits and to subsequently thereby produce a reset pulse at an output of the other charging circuit.

14 Claims, 5 Drawing Figures

INVENTOR.
JOSEPH C. FINLAY

TRIGGER CIRCUIT FOR A BISTABLE MULTIVIBRATOR

BACKGROUND OF THE INVENTION

The invention relates to pulse generating circuits and more particularly to manually actuated, bistable multivibrator trigger circuits.

Prior art discloses manually actuated trigger devices for setting a bistable multivibrator to an initially desired one of two states, to either one of two states or to an opposite state to which it has initially been set. The first device has provision for manually setting a bistable multivibrator to only one of two possible states or for manually ensuring that the multivibrator is already in a desired state. Additional circuitry must be employed to manually transfer the multivibrator to the opposite state. The second device has provision for manually setting the multivibrator to either one of two possible states and requires a duplication of manually actuatable control switches and their associated circuitry. Separate manual operations are necessary for successive transfers of the multivibrator's state. The third device provides for manually transferring the multivibrator to the state opposite that to which it has initially been set. Additional circuitry is required to determine the initial setting. Prior art also discloses manually actuatable trigger devices which internally generate spurious electrical pulses which, in extreme cases, might be erroneously interpreted by associated circuitry as set or reset pulses. Another problem common to devices disclosed by prior art are the effects of spurious electrical pulses generated by switch contact bounce.

SUMMARY OF THE INVENTION

The invention resides in the provision of a set-reset trigger circuit for manually setting a bistable multivibrator to a desired state and automatically resetting it after a predetermined period.

Accordingly it is an object of the present invention to provide a set-reset trigger circuit which is capable of setting a bistable multivibrator to a desired state and then resetting it to its opposite state by employing only one manually actuatable control switch.

It is another object of the invention to provide a circuit which is capable of setting a multivibrator to a desired state upon a single manual actuation and then automatically resetting it to its opposite state after a predetermined period without a second manual actuation being required.

It is yet another object of the invention to provide a circuit which will, upon actuation of a control switch, ensure that a bistable multivibrator has been set to a particular one of its two states.

It is another object of the invention to provide a circuit which is inherently noise free.

Yet another object of the invention is to provide a circuit wherein switch contact bounce is relatively unimportant.

Another object of the invention is to provide a circuit having all of the above-described advantages and which is additionally capable of setting a multivibrator to one state only.

An important aspect of the invention is the use of two parallel-connected, electrical charging circuits, each comprising a resistor and a capacitor so disposed in series that the resistor of one and the capacitor of the other are respectively coupleable to a source of electrical power by a manually actuatable control switch.

Another important aspect of the invention is that the elements of the circuit are kept at ground potential to minimize spurious noise generation during the time the control switch remains unactuated.

BRIEF DESCRIPTION OF THE DRAWINGS

These and other objects, aspects and advantages of the invention will be more clearly understood from the following description when read in conjunction with the accompanying drawings, in which.

OPERATION OF THE INVENTION

Figure 1:
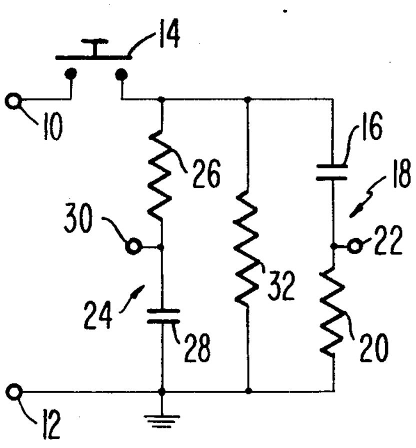
FIG. 1 is an electrical schematic representation of a set-reset trigger circuit for a bistable multivibrator embodying features of the invention.
Figure 2:
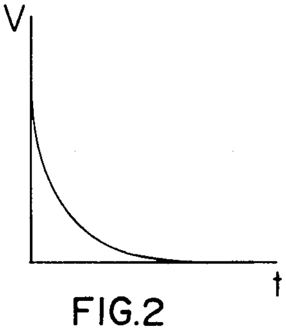
FIG. 2 is a graphic representation of voltage plotted as a function of time as would appear at a point in the circuit shown by FIG. 1 upon actuation of the circuit.

The set-reset trigger circuit shown by FIG. 1 is normally connected to a source of electrical power (not shown) at the points 10 and 12, with the point 12 preferably being at ground potential. Until the control member or switch 14 is actuated, all of the components of the circuits will also be at ground potential. When the switch is first closed, the first capacitor 16 will offer a very low impedance to the current flowing through the first electrical charging circuit generally indicated at 18; and the source voltage will effectively appear across the first resistor 20. The voltage at the first output terminal 22, with respect to ground, will, at this time, also effectively equal the source voltage. As the first capacitor charges, however, its impedance to the current flow through the first charging circuit increases. As its impedance increases, the voltage drop across it also increases; and the voltage drop across the first resistor 20 decreases by a proportional amount. Since the voltage appearing at the first output terminal 22, with respect to ground, is effectively that dropped across the resistor, it will also drop by the same proportional amount. FIG. 2 is a graphic representation of the decline of this voltage with respect to capacitor charging time. The shape of the curve shown is a function of the values of resistance and capacitance in the first charging circuit generally indicated at 18.

Figure 3:
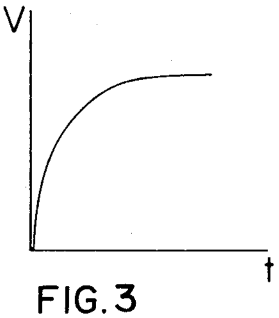
FIG. 3 is a graphic representation of voltage plotted as a function of time as would appear at another point in the circuit shown by FIG. 1 upon actuation of the circuit.

The source voltage will also be applied across the second electrical charging circuit generally indicated at 24 since it is connected in parallel to the first electrical charging circuit generally indicated at 18. It may be noted from FIG. 1 that the second resistor 26 is connected to the switch 14 and the second capacitor 28 to ground in the second charging circuit as opposed to the reverse order for the connection of the first capacitor 16 and first resistor 20 in the first charging circuit. When the switch 14 is first closed, the second capacitor will offer a very low impedance to the current flowing through the second charging circuit; and the source voltage will effectively appear across the second resistor 26. The second output terminal 30 will, at this time, effectively be at ground potential. As the second capacitor charges, however, its impedance to the current flow through the second charging circuit increases. As its impedance increases, the voltage drop across it also increases. Since the voltage appearing at the second output terminal 30, with respect to ground, is effectively that dropped across the capacitor, it will also increase by the same proportional amount. FIG. 3 is a graphic representation of the increase of this voltage with respect to capacitor charging time, the shape of this curve being a function of the values of resistance and capacitance in the second charging circuit generally indicated at 24. When the switch 14 is released, the capacitors will discharge through the electrical resistance circuit or resistor 32.

Figure 4:
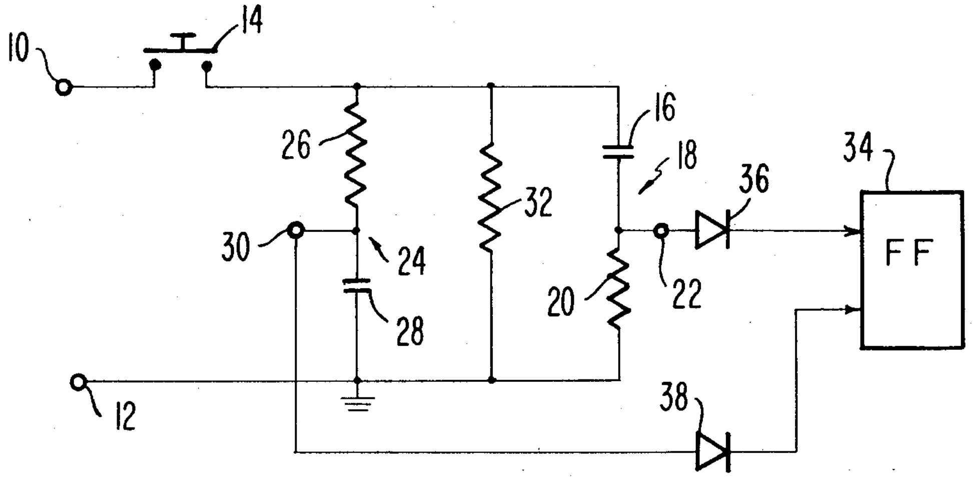
FIG. 4 is an electrical schematic representation of the circuit of FIG. 1 shown operatively coupled in a typical manner to a bistable multivibrator.

In a typical example of a practical application, the set-reset trigger circuit may be connected as shown by FIG. 4 to a bistable multivibrator or flip flop 34. The first output terminal 22 would be connected to the set input of the flip flop through a first isolating diode 36, and the second output terminal 30 would be connected to the reset input of the flip flop through a second isolating diode 38. When the switch 14 is actuated, a pulse initially equal to the source voltage would appear at the first output terminal, thereby setting the flip flop. After a time determined by the specific values of resistance and capacitance used in the trigger circuit, a pulse of sufficient magnitude to reset the flip flop would appear at the second output terminal.

Figure 5:
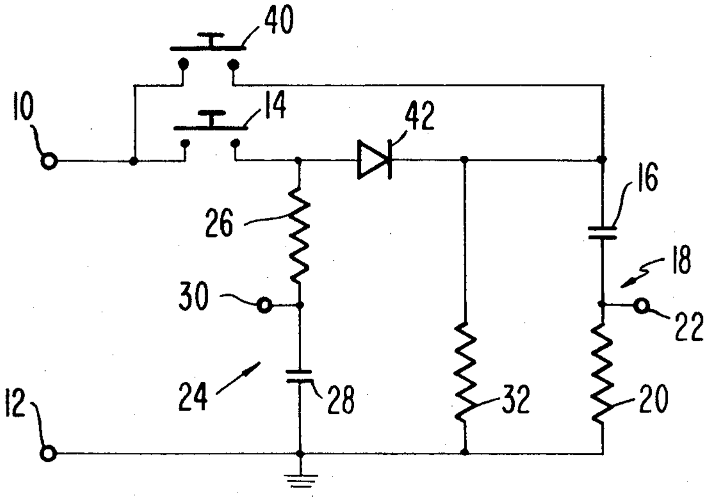
FIG. 5 is an electrical schematic representation of a slightly modified embodiment of the circuit shown by FIG. 1.

The set-reset trigger circuit shown by FIG. 5 is essentially the same circuit as heretofore described; but the addition of a second control member or switch 40 and a unidirectional electrical current conducting member or diode 42 provides an option of producing a set pulse followed by a reset pulse or of producing a set pulse alone. In this trigger circuit, when the switch 14 is closed a pulse similar to that represented by FIG. 2 will appear at the first output terminal 22, this being followed after a predetermined period by a pulse similar to that represented by FIG. 3 appearing at the second output terminal 30. If the trigger circuit were connected to a flip flop in a manner similar to that depicted by FIG. 4, actuating the switch 14 would have the effect of setting and subsequently resetting the flip flop. Actuating the switch 40 would initiate current flow through the first charging circuit generally indicated at 18, but the diode 42 would prevent current flow through the second charging circuit generally indicated at 24. Consequently, a pulse similar to that represented by FIG. 2 would appear at the first output terminal 22, but no pulse would appear at the second output terminal 30. If this trigger circuit were connected to a flip flop in a manner similar to that depicted by FIG. 4, actuating the switch 40 would have the effect of setting the flip flop and not subsequently resetting it.

While the set-reset trigger circuit for a bistable multivibrator has been shown and described in considerable detail, it should be understood that many changes and variations may be made therein without departing from the spirit and scope of the invention.

What is claimed is:

1. A set-reset trigger circuit for a bistable multivibrator comprising:

- a first electrical charging circuit having a first output terminal;
- a second electrical charging circuit operatively coupled in parallel to said first charging circuit and having a second output terminal;
- an electrical resistance circuit operatively coupled in parallel to said first and said second charging circuits; and
- a control member operatively coupled in series with said first and said second charging circuits and with said resistance circuit and actuatable for operatively coupling a source of electrical power across said circuits, thereby producing an immediate set pulse at the first output terminal of said first charging circuit and a subsequent reset pulse at the second output terminal of said second charging circuit.

2. A set-reset trigger circuit for a bistable multivibrator as defined by claim 1 wherein said first electrical charging circuit comprises a first capacitor and a first resistor electrically connected in series, said first capacitor being operatively coupleable to the source of electrical power by said control member.

3. A set-reset trigger circuit for a bistable multivibrator as defined by claim 2 wherein the first output terminal is electrically connected to said first electrical charging circuit between said first capacitor and said first resistor.

4. A set-reset trigger circuit for a bistable multivibrator as defined by claim 3 wherein said second electrical charging circuit comprises a second resistor and a second capacitor electrically connected in series, said second resistor being operatively coupleable to the source of electrical power by said control member.

5. A set-reset trigger circuit for a bistable multivibrator as defined by claim 4 wherein the second output terminal is electrically connected to said second electrical charging circuit between said second resistor and said second capacitor.

6. A set-reset trigger circuit for a bistable multivibrator as defined by claim 5 wherein said control member comprises an electrical switch.

7. A set-reset trigger circuit for a bistable multivibrator comprising:

- a first electrical charging circuit having a first output terminal;
- a second electrical charging circuit having a second output terminal;
- a unidirectional electrical current conducting member, said first charging circuit and said second charging circuit being operatively coupled in parallel by said unidirectional current conducting member;
- an electrical resistance circuit operatively coupled in parallel to said first charging circuit;
- a first control member operatively coupled in series with said second charging circuit and with said first charging circuit and said resistance circuit by said unidirectional current conducting member and actuatable for operatively coupling a source of electrical power across said circuits, thereby producing an immediate set pulse at the first output terminal of said first charging circuit and a subsequent reset pulse at the second output terminal of said second charging circuit; and a second control member operatively coupled in series with said first charging circuit and said resistance circuit and actuatable for operatively coupling a source of electrical power across said circuits, said second charging circuit being electrically isolated by said unidirectional current conducting member, thereby producing an immediate set pulse at the first output terminal of said first charging circuit with no subsequent reset pulse being produced at the second output terminal of said second charging circuit.

8. A set-reset trigger circuit for a bistable multivibrator as defined by claim 7 wherein said first electrical charging circuit comprises a first capacitor and a first resistor electrically connected in series, said capacitor being operatively coupleable to the source of electrical power by said first control member and by said second control member.

9. A set-reset trigger circuit for a bistable multivibrator as defined by claim 8 wherein said first output terminal is electrically connected to said first electrical charging circuit between said first capacitor and said first resistor.

10. A set-reset trigger circuit for a bistable multivibrator as defined by claim 9 wherein said second electrical charging circuit comprises a second resistor and second capacitor electrically connected in series, said second resistor being operatively coupleable to the source of electrical power by said first control member exclusively.

11. A set-reset trigger circuit for a bistable multivibrator as defined by claim 10 wherein the second output terminal is electrically connected to said second electrical charging circuit between said second resistor and said second capacitor.

12. A set-reset trigger circuit for a bistable multivibrator as defined by claim 11 wherein said first control member and said second control member are both electrical switches.

13. A set-reset trigger circuit for a bistable multivibrator as defined by claim 12 wherein said unidirectional current conducting member comprises an electrical diode.

14. A set-reset trigger circuit for a bistable multivibrator comprising:

a first electrical charging circuit comprised of a first capacitor coupled in series with a first resistor, and a first output terminal electrically connected to said first electrical charging circuit between said first capacitor and said first resistor;

a second electrical charging circuit operatively coupled in parallel to said first charging circuit wherein said second electrical charging circuit is comprised of a second resistor electrically connected in series with a second capacitor and a second output terminal electrically connected to said second electrical charging circuit between said second resistor and said second capacitor;

an electrical resistance circuit operatively coupled in parallel to said first and said second charging circuits; and a control member operatively coupled in series with said first and said second charging circuits and with said resistance circuit and actuatable for operatively coupling a source of electrical power across said circuits, thereby producing an immediate set pulse at said first output terminal of said first charging circuit and a subsequent reset pulse at said second output terminal of said second charging circuit.

* * * * *